(12) United States Patent
Mortazavi et al.

(10) Patent No.: US 10,394,786 B2
(45) Date of Patent: Aug. 27, 2019

(54) SERIALIZATION SCHEME FOR STORING DATA AND LIGHTWEIGHT INDICES ON DEVICES WITH APPEND-ONLY BANDS

(71) Applicant: Futurewei Technologies, Inc., Plano, TX (US)

(72) Inventors: Masood Mortazavi, Santa Clara, CA (US); Chi Young Ku, San Ramon, CA (US); Stephen Morgan, San Jose, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 648 days.

(21) Appl. No.: 14/690,612

(22) Filed: Apr. 20, 2015

(65) Prior Publication Data
US 2016/0306836 A1    Oct. 20, 2016

(51) Int. Cl.
*G06F 16/00*    (2019.01)
*G06F 16/22*    (2019.01)

(52) U.S. Cl.
CPC ................. *G06F 16/2272* (2019.01)

(58) Field of Classification Search
CPC ....................... G06F 17/30336; G06F 16/2272
USPC .......................................................... 707/722
See application file for complete search history.

(56) References Cited

U.S. PATENT DOCUMENTS

| | | | | |
|---|---|---|---|---|
| 6,345,268 B1* | 2/2002 | de la Huerga | .......... | G06F 17/22 |
| | | | | 705/2 |
| 6,519,765 B1* | 2/2003 | Kawahito | ................ | G06F 8/43 |
| | | | | 711/108 |
| 6,754,799 B2* | 6/2004 | Frank | ................. | G06F 12/0866 |
| | | | | 711/118 |
| 9,223,843 B1* | 12/2015 | Madhavarapu | ..... | G06F 16/2365 |
| 9,471,610 B1* | 10/2016 | Long | ........................ | G06F 16/00 |
| 9,785,712 B1* | 10/2017 | Lazar | .................... | G06F 16/951 |
| 2003/0110162 A1* | 6/2003 | Newman | ............... | G06F 16/355 |

(Continued)

FOREIGN PATENT DOCUMENTS

CN    1882912 A      12/2006
CN    101539902 A     9/2009

(Continued)

OTHER PUBLICATIONS

Wang, et al., "Lightweight Indexing of Observational Data in Log-Structured Storage," Proceedings of the VLDB Endowment, vol. 7, No. 7, 2014, pp. 529-540.

(Continued)

*Primary Examiner* — Thanh-Ha Dang
(74) *Attorney, Agent, or Firm* — Conley Rose, P.C.

(57) ABSTRACT

A method comprising receiving a plurality of data records, storing the data records as data segments in a storage element, receiving a plurality of descriptors for each data segment, wherein each descriptor describes an aspect of data contained in the data segments, employing a first user-defined function to resolve a first minimum descriptor for each data segment and a first maximum descriptor for each data segment, composing a lightweight index for the data segments, wherein the lightweight index comprises the first minimum descriptor for each data segment and the first maximum descriptor for each data segment, and appending the lightweight index to the data segments in the storage element.

20 Claims, 6 Drawing Sheets

(56) References Cited

U.S. PATENT DOCUMENTS

| | | | |
|---|---|---|---|
| 2003/0236851 A1 | 12/2003 | Cuddihy et al. | |
| 2004/0199485 A1* | 10/2004 | Caswell | G06F 16/2272 |
| 2005/0114391 A1 | 5/2005 | Corcoran et al. | |
| 2009/0132473 A1* | 5/2009 | Hattori | G06F 16/835 |
| 2013/0024460 A1* | 1/2013 | Peterson | G06F 3/061 |
| | | | 707/741 |
| 2013/0204879 A1* | 8/2013 | Zeng | G06F 16/951 |
| | | | 707/747 |
| 2014/0156670 A1* | 6/2014 | Hosomi | G06F 16/245 |
| | | | 707/741 |
| 2016/0026393 A1 | 1/2016 | Reddy et al. | |
| 2017/0024384 A1* | 1/2017 | Kant | G06F 16/51 |

FOREIGN PATENT DOCUMENTS

| | | |
|---|---|---|
| CN | 101796492 A | 8/2010 |
| CN | 101996250 A | 3/2011 |
| CN | 102779180 A | 11/2012 |

OTHER PUBLICATIONS

Partial English Translation and Abstract of Chinese Patent Application No. CN101996250, Sep. 2, 2016, 8 pages.

Foreign Communication From a Counterpart Application, PCT Application No. PCT/CN2016/079579, International Search Report dated Jul. 4, 2016, 7 pages.

Foreign Communication From a Counterpart Application, PCT Application No. PCT/CN2016/079579, Written Opinion dated Jul. 4, 2016, 4 pages.

Machine Translation and Abstract of Chinese Publication No. CN101539902, Sep. 23, 2009, 24 pages.

Foreign Communication From a Counterpart Application, Chinese Application No. 201680023337.1, Chinese Office Action dated Jun. 20, 2019, 11 pages.

\* cited by examiner

SERIALIZATION SCHEME FOR STORING DATA AND LIGHTWEIGHT INDICES ON DEVICES WITH APPEND-ONLY BANDS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The growth of the internet of things (IoT) is expected to result in a drastic increase in the amount of data available to describe the world. One challenge in managing large amounts of data is storing the data in a way that is both space efficient and searchable. Specifically, much of the data generated by IoT devices grows cold quickly. Users are typically most interested in recent data and significantly less interested in older data. Space efficient storage of such cold data in a searchable fashion will become increasingly important as the IoT become more widely adopted across a wide range of devices. Further, employing smart searching techniques may be required to allow a user to find specific useful data amongst the massive amounts of data being continuously generated.

SUMMARY

In one embodiment, the disclosure includes a method comprising receiving a plurality of data records, storing the data records as data segments in a storage element, receiving a plurality of descriptors for each data segment, wherein each descriptor describes an aspect of data contained in the data segments, employing a first user-defined function to resolve a first minimum descriptor for each data segment and a first maximum descriptor for each data segment, composing a lightweight index for the data segments, wherein the lightweight index comprises the first minimum descriptor for each data segment and the first maximum descriptor for each data segment, and appending the lightweight index to the data segments in the storage element.

In another embodiment, the disclosure includes an apparatus comprising a receiver configured to receive a plurality of data records, and receive a plurality of descriptors for each data record, wherein each descriptor describes an aspect of data contained in the data records, a memory comprising a data band configured to store the data records as data segments in append-only format, a processor coupled to the receiver and the memory, wherein the processor is configured to employ a first user-defined function to resolve a plurality of minimum descriptors for each data segment and a plurality of maximum descriptors for each data segment, compose a lightweight index for the data segments, wherein the lightweight index comprises the minimum descriptors for each data segment and the maximum descriptors for each data segment, and append the lightweight index to the data segments in the data band.

In another embodiment, the disclosure includes a method comprising storing a plurality of lightweight indices each associated with one of a plurality of append-only data bands, wherein each lightweight index comprises at least one minimum descriptor for each of a plurality of data segments in the associated data band, and at least one maximum descriptor for each of the plurality of data segments in the associated data band, receiving a query comprising at least one query term, and searching the stored lightweight indices to find data segments for which the query term is satisfied for a range bounded by the associated minimum descriptor and the associated maximum descriptor, and returning an indication of each data band comprising a found data segment and a relative start location for each found data segment in the associated data band.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
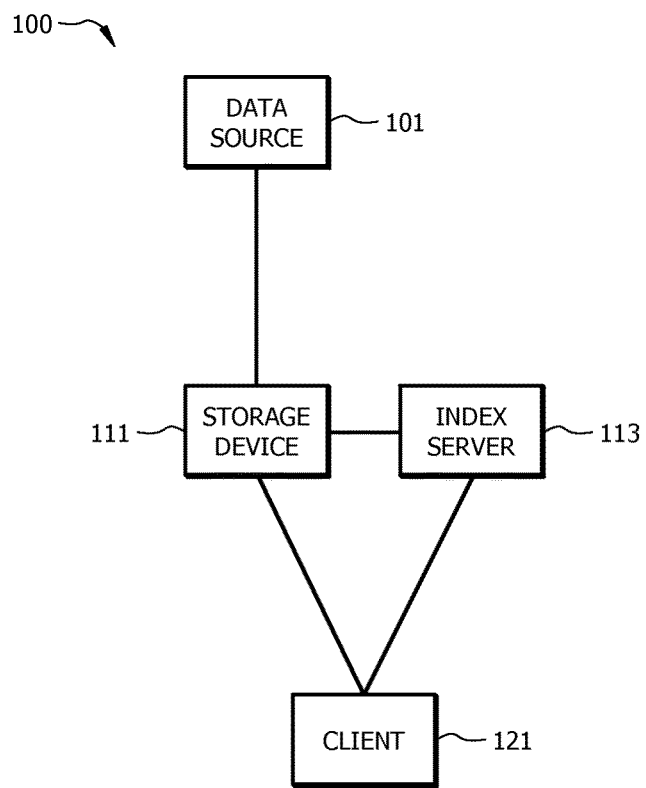
FIG. 1 is a schematic diagram of an embodiment of a storage network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various mechanisms for storing and indexing cold data in a space efficient and searchable manner. As discussed below, data may be more space efficiently stored in append-only format. In such a system, a plurality of data segments are written to a storage element (e.g. a data band) in a storage device. An element comprises a header, a series of segments, a lightweight index and a seal. Segment data is the compressed form of a series of records. A segment comprises a segment header, segment data, and a segment checksum. Segment data is a compressed form of a set of records. A record comprises a time and a series of attributes. A descriptor is a mathematical function (with whatever level of complexity) defined on a set of attributes expected in an associated record. A descriptor interval may be defined by two descriptor values: a low bound (minimum) and a high bound (maximum) value of a given descriptor. A lightweight index (which may reside near the end of each element) comprises, among other information, a mapping of segment identifiers (IDs) to a set of descriptor intervals and the relevant time interval for each segment. The lightweight index may also comprise a mapping of segment IDs to the relative location of each segment header in an element. The relative location may be employed as a sequence ID in some embodiments, in which case use of the segment ID to relative location mapping is not needed. The storage device also receives attributes that describe various aspects of the data records and a time associated with the data records. When a storage element is nearly full, the storage device compresses the lightweight index that summarizes the aspects (e.g. descriptor intervals) of each of the data segments, and appends this compressed lightweight index to the storage element. It should be noted that actual compression is not inherently necessary, and that a compression of unit value is also a compression but of factor 1.0. The lightweight index is generated by resolving a user-defined function (e.g. descriptor) on the attributes to generate maximum descriptor(s) and minimum descriptor(s) for each data segment. The descriptors are stored in the index along with a time/time range associated with the data segments. The storage element is then designated as full by appending a seal to the end of the storage element. The seal comprises data indicating the relative start location of the lightweight index. The lightweight index may also be forwarded to an index server for storage and query processing purposes. Upon receiving a query comprising a query term, time, and/or time range, the storage element, or index server, reviews the lightweight indices for data segments associated with the time range. The storage element/index server then returns indications of data segments for which the query term is satisfied for a range bounded by the minimum/maximum descriptors. For example, a data segment may be associated with temperature data and may have a maximum temperature and a minimum temperature over a specific time period. Upon receiving a query term of seventy degrees Fahrenheit (° F.), the storage device/index server may return all data segments with both a maximum descriptor that is greater than or equal to 70° F. and a minimum descriptor that is less than or equal to 70° F. over a specified time period. Each data segment may comprise multiple descriptors. For example, a data segment may comprise data describing measuring electrical current in a device, and the descriptors may comprise measured temperature, noise volume, humidity, etc., measured at the time the electrical current measurement was taken. By employing multiple descriptors, advanced queries may be employed, such as returning all data segments associated with a specified temperature, humidity, and noise volume, etc. Descriptors may also be employed for video data, for example by indicating the number of people in a video stream over a given interval. The lightweight index may be employed to quickly obtain security video footage with that meets the relevant criteria, for example by returning all video segments showing more than a specified number people over a time interval, etc.

FIG. 1 is a schematic diagram of an embodiment of a storage network 100. Network 100 comprises a data source 101, a storage device 111, an index server 113, and a client 121. The index server 113 may be omitted in some embodiments. Storage device 111 receives a bit-stream from data source 101, stores data records from the bit-stream as data segments, and indexes the data segments. In an embodiment, the storage device 111 forwards indices to the index server 113 for separate storage. At a later time, the client 121 transmits a query to the storage device 111 or the index server 113, depending on the embodiment. The entity receiving the query (e.g. the storage device 111 or the index server 113) reviews the indices in light of the query and returns data segments and/or relative locations of data segments that are implicated by the query.

Data source 101 comprises any device configured to capture data and forward an associated bit-stream to storage device 111. For example, data source 101 may comprise a video and/or audio monitoring system, an IoT device comprising a sensor, a data center that captures data on system status/utilization, a mobile network that captures data on system status/utilization, etc. Accordingly, the bit-stream comprises data records that comprise any of a diverse array of data such as media (e.g. video and/or audio data), sensor data, and/or any other type of time series data that is substantially continuously monitored. Each data record may also comprise a time/time range associated with the data and one or more descriptors associated with the data segment. The descriptors each describe an aspect of the data. For sensor based data, each descriptor may comprise an attribute associated with the data, such as temperature, current, device utilization, or any other attribute relevant to the data. For example, a sensor based record may be transmitted as <Time t; Attribute$_1$ a$_1$; . . . ; Attribute$_n$ a$_n$>, where time t is the time the sensor data was captured, Attributes$_{1-n}$ comprise any number n of attributes that describe the data in the record, and a$_1$ through a$_n$ comprise values for the associated attributes. For media based data, each descriptor may comprise a blob associated with the data, where a blob is any type of metadata associated with the data. For example, a media based record may be transmitted as <Time t; Blob$_1$ b$_1$; . . . ; Blob$_n$ b$_n$>, where time t is the time the media data was captured, Blobs$_{1-n}$ comprise any number n of blobs that describe the data in the data record, and b$_1$ through $_{bn}$ comprise values for the associated blobs.

Storage device 111 comprises any device configured to receive the bit-stream comprising the data records, store data from the data records as data segments, and index the data segments for searchability. The storage device 111 may store each record as received in a data segment (e.g. in the event the record is received as compressed data with a header and a checksum) or may process the data record prior to storage by compressing the data from a series of records and adding a header and a checksum to create a data segment. As discussed with reference to FIG. 3 below, storage device 111 may be configured for append-only data storage for increased data density storage. Storage device 111 may continuously append received data segments to a storage element, such as a data band on a memory device. Once the storage element is nearly full, the data storage device generates a lightweight index describing each data segment in the storage element and appends the index to the last data segment in the storage element. The lightweight index may indicate a time and/or time range for each data segment. Generating the lightweight index further comprises resolving one or more user-defined functions (e.g. descriptors) on the attributes associated with each data record and maintaining maximum and minimums for these descriptors for the set of records that are to be included in a particular segment. Such user-defined functions may be received from the data source 101 and/or configured into the storage device 111 upon setup. The user-defined functions may comprise an identify function that returns particular attributes themselves or other useful data related to the attributes. Resolving each user-defined function results in the creation of a maximum descriptor and a minimum descriptor (e.g. for each function). The maximum descriptors and the minimum descriptors for each data segment are then stored in the lightweight index. For example, the lightweight index for each data segment with Attributes$_{1-n}$ may be described by $t^{min}$, $t^{max}$, $Min_1(f_1(a_1, \ldots, a_n), Max_1(f_1(a_1, \ldots, a_n), \ldots Min_m(f_m(a_1, \ldots, a_n), Max_m(f_m(a_1, \ldots, a_n))$, where $t^{min}$ indicates the start time of the data segment, $t^{max}$ indicates the end time of the data segment, $f_1$ though $f_m$ describe any number m of user-defined functions applied to attribute values $a_1$ through $a_n$, and $Min_1$, $Max_1$ through $Min_m$, $Max_m$ indicate a minimum and a maximum result for each of the m user-defined functions. Similarly, the lightweight index for each data segment with Blobs$_{1-n}$ may be described by $t^{min}$, $t^{max}$, $Min_1(f_1(b_1, \ldots, b_n), Max_1(f_1(b_1, \ldots, b_n), \ldots Min_m(f_m(b_1, \ldots, b_n), Max_m(f_m(b_1, \ldots b_n))$, where $t^{min}$ indicates the start time of the data segment, $t^{max}$ indicates the end time of the data segment, $f_1$ though $f_m$ describe any number m of user-defined functions applied to blob values $b_1$ through $b_n$, and $Min_1$, $Max_1$ through $Min_m$, $Max_m$ indicate a minimum and a maximum result for each of the m user-defined functions. By employing a minimum descriptor and a maximum descriptor (e.g. for each function) and each data segment, the related minimum and maximum descriptors create a bounded range. When queried, the lightweight index can be employed to quickly determine all data segments with a range that includes or otherwise satisfies the query term. As the functions are user-defined, the lightweight descriptor can be configured to indicate data segments that are relevant to substantially any query. For example, the lightweight index could be employed to return all data segments comprising video images from a specified camera over a specified date/time range that include three or more people. The lightweight index could also be employed to return data associated with all processor cores in a specified data center over a specified date/time range with a specified utilization percentage. Upon appending the lightweight index to the storage element, the storage device 111 appends a seal to the end of the storage element. The seal indicates the storage element is full and provides a pointer to the relative position of the lightweight index in the storage element.

In an embodiment, the storage device 111 may also forward the lightweight indices to index server 113. The index server 113 maintains the lightweight indices and receives queries from client 121. In an embodiment, upon receiving a query with one or more query terms the index server 113 searches the lightweight indices and returns an indication to the client 121 of a relative location of each data segment implicated by the query term(s) and an indication of the associated storage element. In another embodiment, the index server 113 returns indications directly to the storage device 111 so that the storage device 111 can forward all relevant data segments to the client 121. In yet another embodiment, the index server 113 receives queries from the client 121 via the storage element 111 and returns indications to the storage device 111.

Client 121 may be any device configured to forward a query comprising one or more query terms to the storage device 111 and/or the index server 113. Depending on the embodiment, the client 121 may receive indications of data segments relevant to a query from the index server 113 and forward requests to the storage device 111 to obtain the relevant data segments. The client 121 may also transmit queries directly to the storage device 111 and/or receive responsive indications and/or relevant data segments directly from the storage device 111. As such, the client 121 may not be directly aware of the index server 113 in some embodiments.

Figure 2:
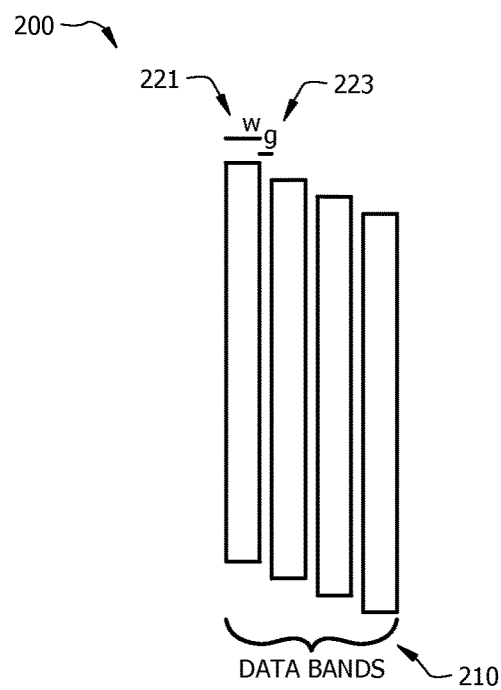
FIG. 2 is a schematic diagram of an embodiment of a general data storage scheme.

FIG. 2 is a schematic diagram of an embodiment of a general data storage scheme 200, which may be employed by a storage device, such as storage device 111. In data storage scheme 200, data is stored in a plurality of data bands 210. Each data band 210 comprises a relatively large amount of data, for example 32-256 megabytes (MBs). As a specific example, when a data stream transmits sixty four bits of data at a frequency of one transmission per five seconds, approximately four weeks of the data stream can be stored in a 32 MB data band. The storage device comprises write heads for writing the received data to the memory and read heads for reading data from the memory. Each data band 210 is approximately the same written width (w) 221 as the write head. For reasons associated with the hardware, data near the center of the write head comprises fewer errors than data at the edges of the write head. Accordingly, the read heads are smaller than the write heads and only read the center of each data band 210. Gaps (g) 223 are positioned between each data band to prevent adjacent data bands 210 from becoming corrupted during the writing process. Data storage scheme 200 allows each data band to be written, read, and overwritten independently. However, the existence of g 223 decreases that number of data bands 210 that fit in any specified area of the memory.

Figure 3:
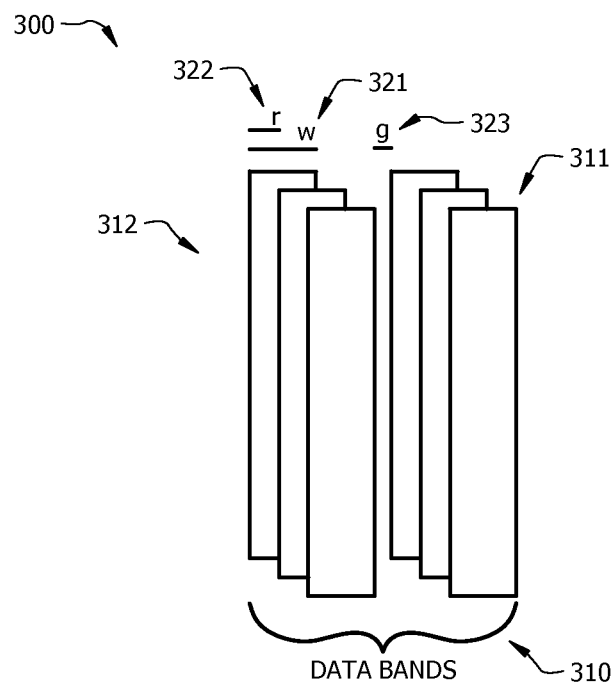
FIG. 3 is a schematic diagram of an embodiment of an append-only data storage scheme for cold data.

FIG. 3 is a schematic diagram of an embodiment of an append-only data storage scheme 300 for cold data, which may be employed by a storage device, such as storage device 111. Data storage scheme 300 employs data bands 310, which are similar to data bands 210. In contrast to data storage scheme 200, data storage scheme 300 groups the data bands 310 together into groups 311 and 312 by eliminating some of the gaps 223 shown in scheme 200. While scheme 300 depicts a first group 311 of bands 310 and a second group 312 of bands 310, any number of groups can be used. Group 311 is separated from group 312 by a gap (g) 323. Data storage scheme 300 shingles the data bands 310 by causing each data band 310 in a group to overwrite a portion of a previous data band 310 in the group. While portions of the written width (w) 321 of the data bands 310 are overwritten, a read width (r) 322 for each data band 310 is maintained (e.g. not overwritten). Accordingly, scheme 300 maximizes the number of data bands 310 that fit in a specified space by exploiting the difference in sizes between the read head and the write head. The operational costs associated with scheme 300 are that overwriting any band 310 will also overwrite/corrupt data in any subsequent band 310. As such, scheme 300 is an append-only scheme. New bands 310 may be appended to the end of any group 311 or 312 without corrupting data so long as gap 323 is maintained. Overwriting any written band 310 also requires overwriting all subsequent bands 310 in the associated group 311 or 312. As such, scheme 300 is poorly suited for data requiring frequent updates, but is well suited for storage of large amounts of cold data that is rarely altered after storage. For example, data storage scheme 300 allows for optimal data band 310 storage space efficiency, which is beneficial for large amounts of data, without requiring a significant operational cost as cold data is rarely modified.

Figure 4:
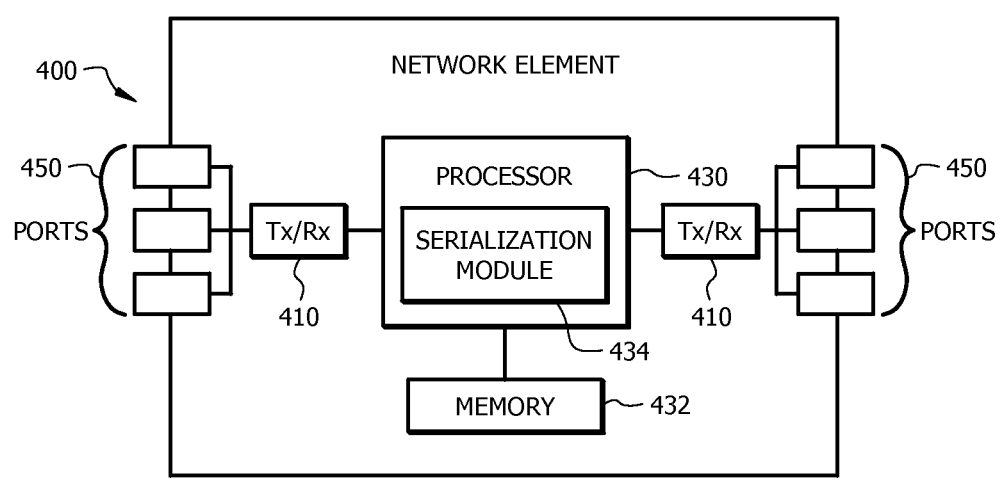
FIG. 4 is a schematic diagram of an embodiment of a network element (NE) configured to perform data storage.

FIG. 4 is a schematic diagram of an embodiment of an NE 400 acting as a node in a network, such as a storage device 111, an index server 113, a client 121, and/or a data source 101 in network 100, and configured to store, index, and/or search data segments, for example in an append-only format as described in FIG. 3. NE 400 may be implemented in a single node or the functionality of NE 400 may be implemented in a plurality of nodes in a network. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 400. For instance, the features/methods in the disclosure may be implemented using hardware, firmware, and/or software installed to run on hardware. The NE 400 may be any device that processes, stores, and/or forwards data frames through a network, e.g. a server, a client, a data source, etc. As shown in FIG. 4, the NE 400 may comprise transceivers (Tx/Rx) 410, which may be transmitters, receivers, or combinations thereof. Tx/Rxs 410 may be coupled to a plurality of ports 450 (e.g. upstream interfaces and/or downstream interfaces) for transmitting and/or receiving frames from other nodes. A processor 430 may be coupled to the Tx/Rxs 410 to process the frames and/or determine which nodes to send frames to. The processor 430 may comprise one or more multi-core processors and/or memory devices 432, which may function as data stores, buffers, etc. Processor 430 may be implemented as a general processor or may be part of one or more application specific integrated circuits (ASICs) and/or digital signal processors (DSPs). Processor 430 may comprise a serialization module 434, which may perform methods 700, 800, and/or 1000, depending on the embodiment. In an embodiment, the serialization module 434 receives, stores, and indexes data segments. In another embodiment, the serialization module 434 reviews indices and returns data segments and/or pointers to data segments based on a query. In an alternative embodiment, serialization module 434 may be implemented as instructions stored in memory 432, which may be executed by processor 430, for example as a computer program product. In another alternative embodiment, the serialization module 434 may be implemented on separate NEs. The ports 420 may contain electrical and/or optical transmitting and/or receiving components.

It is understood that by programming and/or loading executable instructions onto the NE 400, at least one of the processor 430, serialization module 434, ports 450, Tx/Rxs 410, and/or memory 432 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
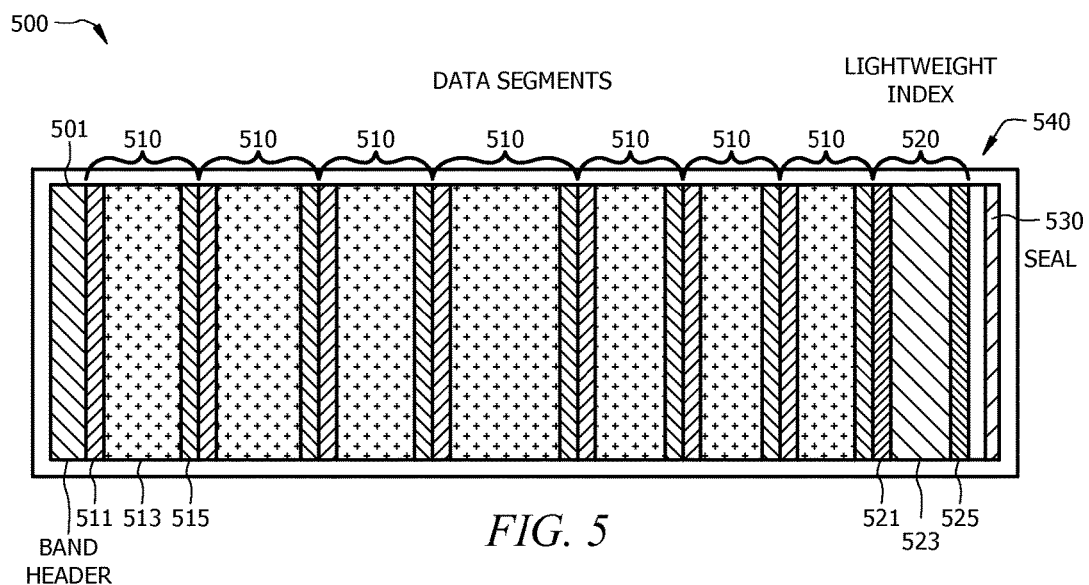
FIG. 5 is a schematic diagram of an embodiment of a sealed data band.

FIG. 5 is a schematic diagram of an embodiment of a sealed data band 500. Sealed data band 500 may or may not be an append-only band and may be substantially similar to bands 210 or 310. Sealed data band 500 is an example storage element created by a storage device such as storage device 111 or NE 400 upon receiving a bit-stream of data records from a data source, such as data source 101. Sealed data band 500 may be created by method 700 and/or 1000 and searched by method 800. In an embodiment, sealed data band 500 may comprise about 32-256 MBs of data. In another embodiment, sealed data band 500 may comprise significantly less data, for example about 4 MB.

Sealed data band 500 comprises a band header 501, data segments 510, a lightweight index 520, a gap 540, and a seal 530. In an embodiment where sealed data band 500 is an append-only band, the data band 500 is initialized upon receipt of a data record by the storage element. Band header 501 may be appended to the data band 500 first, and may comprise data indicating characteristics of the data band 500, such as a pre-determined size of the data band 500, a start location of the data band 500, pointers to a next and/or previous band, etc.

The first received data record for the data band 500 may then be converted into a data segment 510 and appended to the band header. The record may be converted into a data segment 510 by compressing the data record to create a compressed segment 513, adding a segment header 511 to the front of the compressed segment 513, and adding a checksum 515 to the end of the compressed segment 513. The segment header 511 comprises data indicating the size of the data segment 510. The compressed segment 513 comprises compressed data from the received record, such as captured data, time and/or time ranges (e.g. indicating when the data was captured, transmitted, etc.), and/or descriptors describing aspects of the data as discussed hereinabove with respect to FIG. 1. The checksum 515 comprises a calculated value based on the data in the data segment 510. The checksum 515 may be independently calculated upon retrieval of the data segment 510 to ensure the data segment is not corrupted. As such, the segment header 511 and the checksum 515 are added to the data segment 510 to ensure the integrity of the data segment 510. The compressed segments 513 may vary in size, and the data segments 510 may vary in size accordingly. In an alternate embodiment, the data segment 510 is received directly from the data source (e.g. data source 101) as a record in which case compression of the record and the addition of the segment header 511 and checksum 515 may be omitted.

Additional data records are received and stored as data segments 510 by appending each data segment 510 to a previous data segment 510 until the data band 500 is full.

Each data segment comprises a segment header 511, compressed segment 513, and the checksum 515. The data band 500 may be determined to be full when a size of a data segment 510 to be stored plus an expected size of the lightweight index 520 and an expected size of the seal 530 exceeds the remaining available space in the data band 500. Upon determining the data band 500 is full, the storage device calculates the lightweight index 520 and appends the lightweight index 520 to the last data segment 510. The lightweight index 520 is comprises a lightweight index header 521 positioned at a relative start location of the lightweight index 520. The lightweight index header 521 indicates the size of the lightweight index 520. The lightweight index 520 further comprises index data 523, which comprises minimum descriptor(s) and maximum descriptor(s) for each data segment 510 that are resolved from user-defined function(s) applied to the attributes received in each data record as discussed hereinabove with respect to FIG. 1. The lightweight index 520 further comprises a checksum 525, which is substantially similar to checksums 515 and is employed to ensure the integrity of the lightweight index 520.

Once the lightweight index 520 is appended to the data band 500, a seal 530 is appended to the end of the data band 500. The seal 530 indicates the data band 500 is full. For example, the seal 530 may be thirty two bits long and may occupy the last thirty two bits of space in the data band 500. The seal 530 comprises data indicating the relative start location of the lightweight index 520 (e.g. a pointer). Accordingly, the storage device can read the lightweight index 520 by two movements of the read head of the storage device. Specifically, the read head can read the seal 530, and move directly to reading the lightweight index 520.

As data segments 510 and the lightweight index 520 may vary in size, a gap 540 of varying size may exist between the lightweight index 520 and the seal 530. The size of the gap 540 is equal to a difference of the total size of the data band 500 and the sum of the sizes of the data segments 510, the lightweight index 520, and the seal 530.

Figure 6:
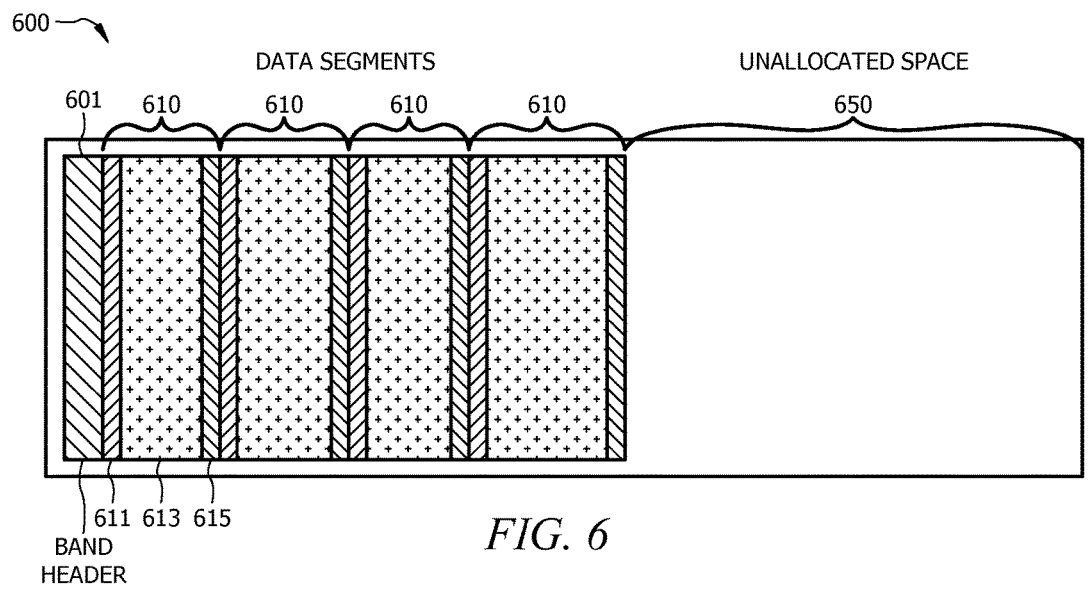
FIG. 6 is a schematic diagram of an embodiment of an open data band.

FIG. 6 is a schematic diagram of an embodiment of an open data band 600. Open data data band 600 may be substantially similar to sealed data band 500, but illustrates the state of data band 600 before the data band 600 is full. Open data band 600 is an example storage element created by a storage device such as storage device 111 or NE 400 upon receiving a bit-stream of data records from a data source, such as data source 101. Open data band 600 may be created by method 700 and/or 1000. Open data band 600 comprises a band header 601 and data segments 610 each comprising a segment header 611, a compressed segment 613, and a checksum 615, which may be substantially similar to band header 501, data segments 510, segment headers 511, compressed segments 513, and checksums 515, respectively. Data band 600 further comprises unallocated space 650, which contains no data or data that has been designated to be overwritten. When a storage device, such as storage device 111, receives additional records/data segments 610, such segments 610 are appended into unallocated space 650. Once the remaining unallocated space 650 is no longer sufficient to store an additional segment 610, a lightweight index (such as lightweight index 520) and a seal (such as seal 530), the data band 600 is no longer considered open for more data segment 610 storage. At such point, the band is considered to be full. Then a lightweight index is determined and appended before a seal is determined and appended. Once the seal is appended, the data band 600 is considered a sealed band and may be substantially similar to sealed band 500.

Figure 7:
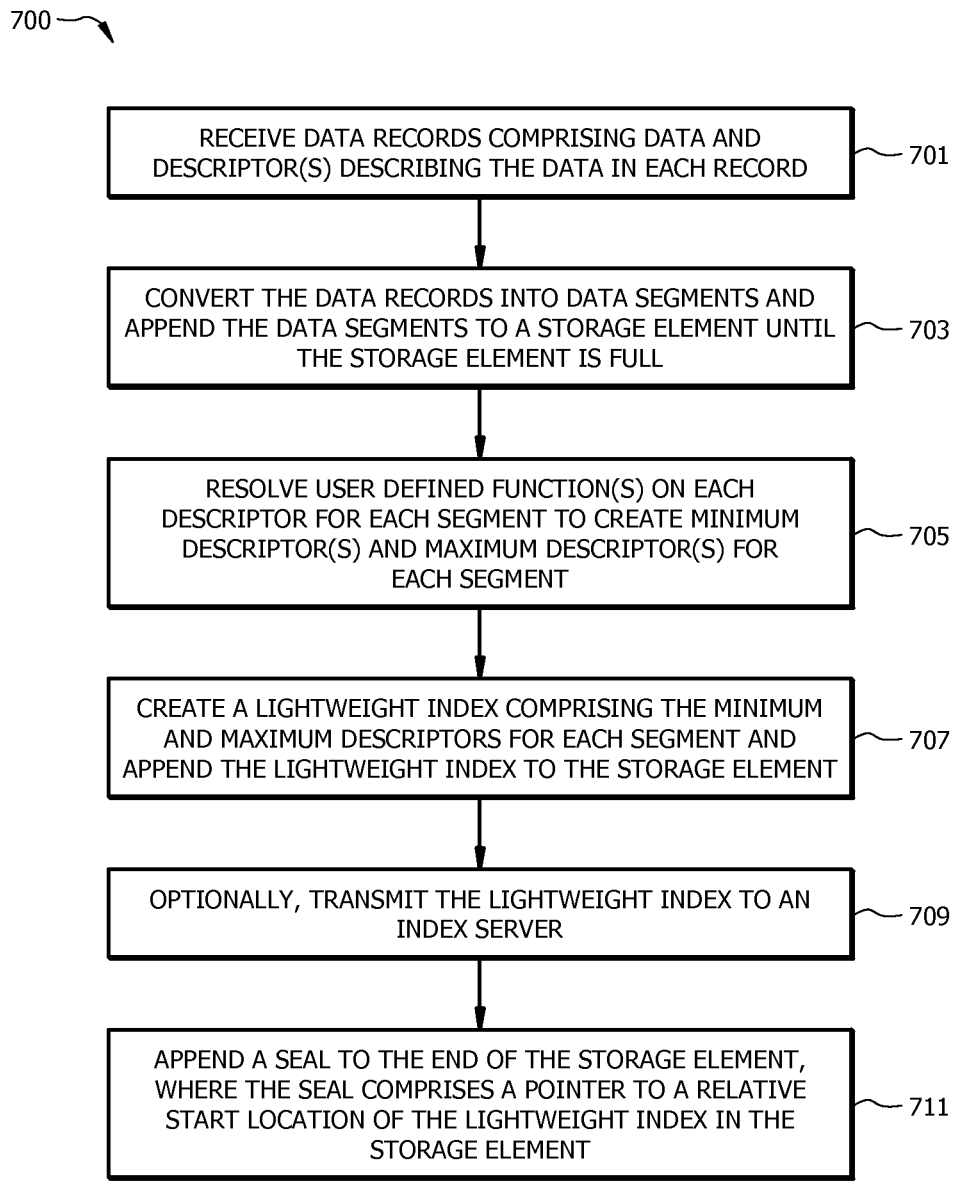
FIG. 7 is a flowchart of an embodiment of a method of storing a storage element with a lightweight index.

FIG. 7 is a flowchart of an embodiment of a method 700 of storing a storage element with a lightweight index, such as data bands 500 and/or 600. Method 700 may be employed by a storage device, such as storage device 111 and/or NE 400 to create when a bit-stream comprising data records is received from a data source, such as data source 101. At step 701, data records are received. The data records each comprise data (e.g. captured by the data source) and descriptor(s) that each describe aspect(s) of the data in the associated data record, as described more fully with respect to FIG. 1. At step 703, each data record is converted into a data segment by compressing the data record and adding a header and checksum to the compressed record. The data segment is then appended to the storage element until the storage element is full, as discussed with respect to FIGS. 5-6. At step 705, once the storage element is full, one or more user-defined functions are resolved on each descriptor for each data segment. Resolving the function(s) results in the creation of, for each data segment, a maximum descriptor for each function applied to each received descriptor, and a minimum descriptor for each function applied to each received descriptor. At step 707, a lightweight index is created and appended to the last data segment in the storage element. The lightweight index comprises the minimum and maximum descriptors for each data segment, a time and/or time range for each data segment, and a pointer to a relative start location of each data segment. At optional step 709, the lightweight index may be transmitted to a separate index server (e.g. for dedicated query processing). At step 711, a seal is appended to the end of the storage element. The seal comprises a pointer to the relative start location of the lightweight index in the storage element, which allows the lightweight index to be quickly found and examined in the event of a query.

Figure 8:
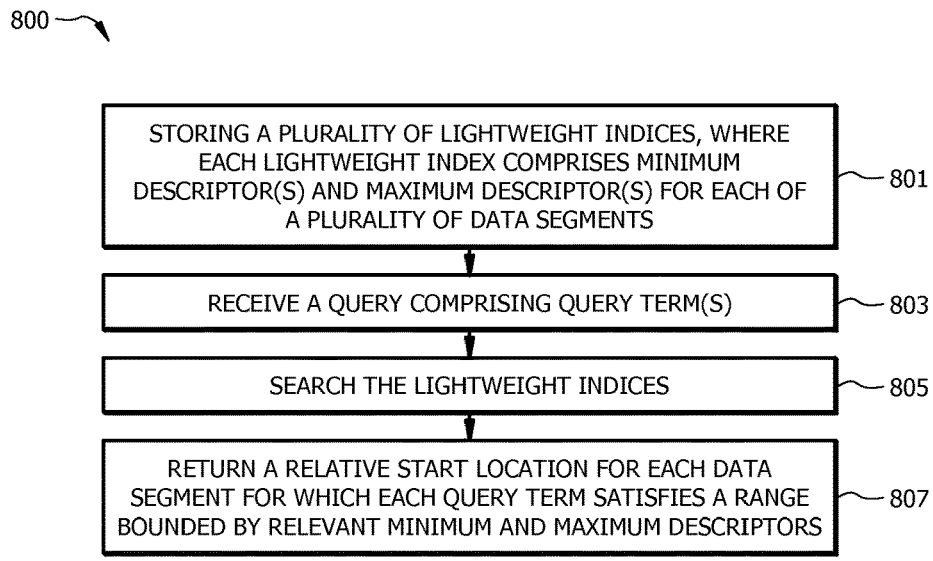
FIG. 8 is a flowchart of an embodiment of a method of searching a plurality of storage elements by employing lightweight indices.

FIG. 8 is a flowchart of an embodiment of a method 800 of searching a plurality of storage elements, such as data band 500, by employing lightweight indices. Method 800 may be employed by a storage device and/or an index server, such as storage device 100, index server 113, and/or NE 400 to search for data segments when a query is received from a client, such as client 121. In an embodiment, method 800 is implemented by a storage device when sealing full storage elements such as data band 500. In an alternate embodiment, method 800 is implemented by an index server upon receiving lightweight indices from a storage device. At step 801, lightweight indices are obtained and stored. Each lightweight index comprises minimum descriptors and maximum descriptors for each data segment, user-defined function, received descriptor, etc., as discussed above. At step 803, a query comprising one or more query terms is received, for example from a client or from a storage device. The query term(s) may comprise a time/time range, and/or data relevant to any descriptor, such as a data attribute, a blob/metadata, etc. At step 805, the lightweight indices are searched. For example, when a time range is received, each lightweight index associated with a data segment that was captured during the time range is searched. At step 807, a relative start location (or other indication) is returned for each data segment found for which each query term satisfies a range bounded by relevant minimum and maximum descriptors. As an example, a query term may indicate a value (e.g. four) or more, in which case any range bounded by a minimum/maximum descriptor comprising a value equal to or in excess of the indicated value (e.g. five) is returned. More advanced queries comprising a plurality of terms may also be supported, for example return all data segments for video (a first term) taken during a specified time range (a second term) comprising images of a specified number of people (a third term) in a specified location (a fourth term), etc. As such, the sophistication of the supportable query is limited only by the nature and number of minimum/maximum descriptors stored for the data segment. It should be noted that, for this example embodiment, GPS data on video might indicate relative location. Further a descriptor may comprise a bounding box through a minimum corner and a maximum corner of a geographic area. Accordingly, the descriptor may be expressed as a function for extracting geolocation, as a function of a bounding box may be well ordered and amenable to extraction of a minimum and a maximum coordinate for the bounding frame/box. A relative start location (e.g. or other indication) of each storage segment comprising a found data segment may also be returned. The locations/indications may be returned to the requesting client, storage device, etc.

Figure 9A:
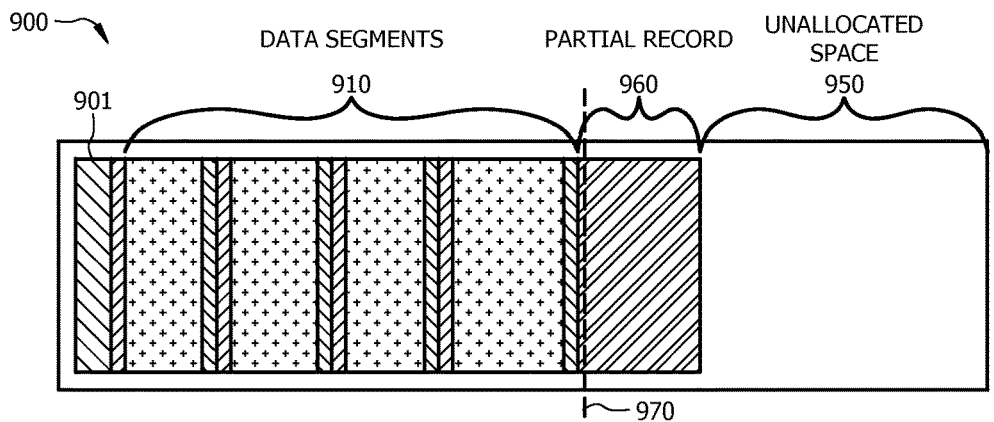
FIGS. 9A-B illustrate an embodiment of durable storage scheme for an open data band.
Figure 9B:
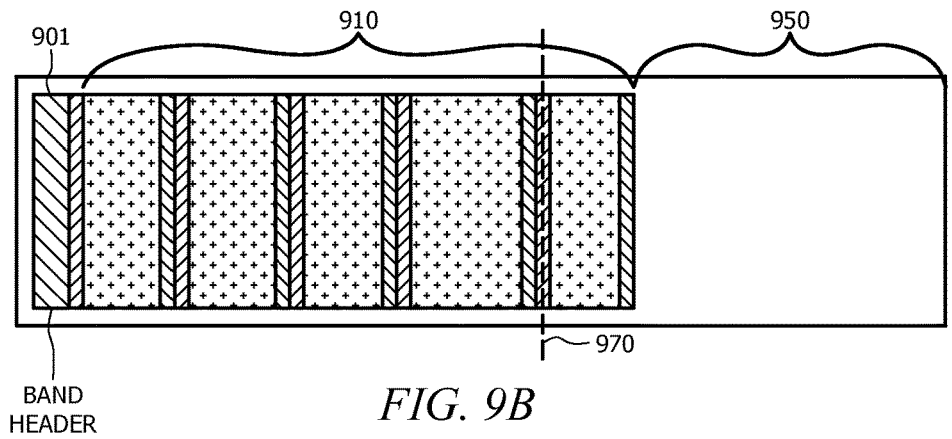

FIGS. 9A-B illustrate an embodiment of a durable storage scheme 900 for an open data band, such as open data band 600, in a storage device such as storage device 111. The data band comprises a band header 901, data segments 910, and unallocated space 950, which may be substantially similar to band header 601, data segments 610, and unallocated space 650, respectively. The open data band operated on by scheme 900 is an example storage element created by a storage device such as storage device 111 or NE 400 upon receiving a bit-stream of data records from a data source, such as data source 101. The open data band of scheme 900 may be created by method 700 and/or 1000.

FIG. 9A illustrates the band at a first time, when a partial record 960 is received from a data source, such as data source 101. The partial record 960 is continuously stored by appending new portions of the partial record 960 behind the last data segment 910. Specifically, the partial record 960 is appended at a start location 970 (depicted as a dashed line) adjacent to the immediately preceding completed data segment 910 adjacent to the start location 970. The partial record 960 may be received and stored in an uncompressed form with no segment header or checksum. Once the partial record 960 is completely received, the partial record 960 is read and compressed to create a compressed segment, such as compressed segment 613. A segment header and checksum (e.g. segment header 611 and checksum 615) are added to the compressed segment to create a data segment 910. The newly created data segment 910 is then appended to the last data segment 910 at start location 970, overwriting the partial record 960. FIG. 9B illustrates the data band at a second time when the partial record 960 has been overwritten by the newly created data segment 910 at the start location 970. The start location 970 then becomes a relative start location for the newly created data segment 910. Continuously storing partial records, such as partial record 960, increases the durability of the storage scheme 900. A partial record 960 may be stored for a significant period of time. In the event of a power failure, hardware error, software error, etc., a partial record stored in Random Access Memory (RAM) may be lost. By temporarily appending the partial record 960 to the data band, the partial record 960 is protected from data loss. Further, storing partial records 960 in data bands decreases the amount of RAM needed to operate a storage device, which may decrease the hardware costs associated with scheme 900.

Figure 10:
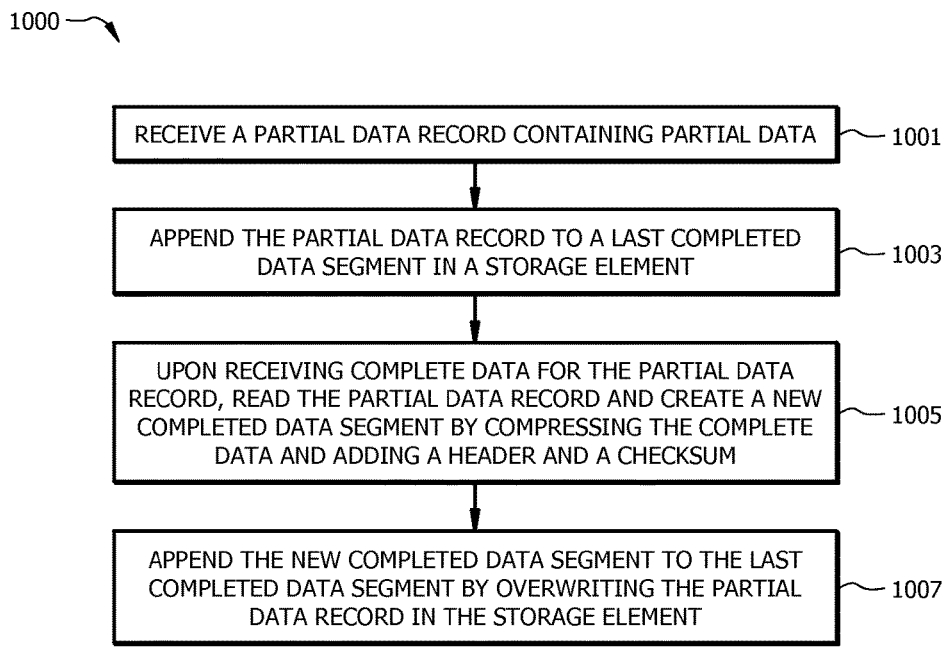
FIG. 10 is a flowchart of an embodiment of a method of durable storage for a storage element.

FIG. 10 is a flowchart an embodiment of a method 1000 of durable storage in a storage element, such as data band 600, based on a storage scheme such as scheme 900. Method 1000 may be implemented by a storage device, such as storage device 111, and may be initiated upon receiving a partial record, such as partial record 960. At step 1001, the partial record containing partial data is received. At step 1003, the partial data record is appended to the last completed data segment (e.g. data segment 910 adjacent to start location 970) in the storage element. At step 1005, upon receiving complete data for the partial data record, the partial record is read. A new completed data segment is created by compressing the complete data, adding a header to the front of the compressed data and adding a checksum to the end of the compressed data. At step 1007, the newly completed data segment is appended to the storage element after the last completed data segment as discussed with respect to FIGS. 9A-B. The partial data record is then overwritten.

Figure 11:
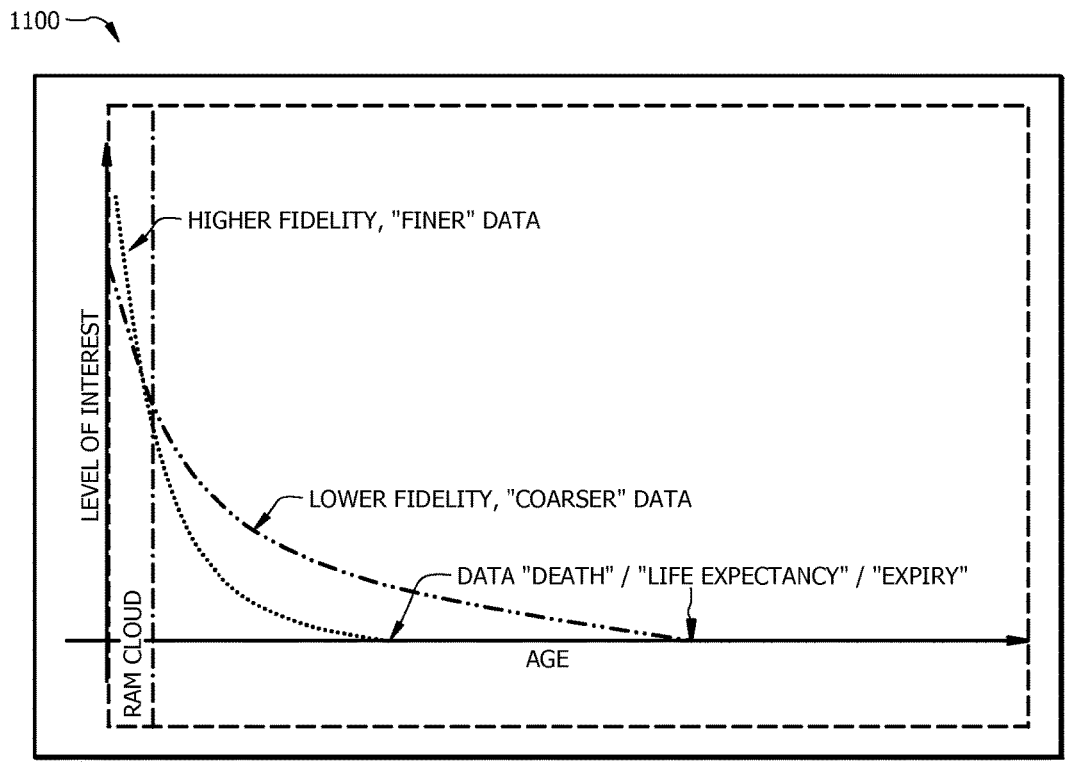
FIG. 11 is a graph of example user interest in data over time.

FIG. 11 is a graph 1100 of example user interest in data over time. In graph 1100, level of user interest is depicted in the vertical axis and data age is depicted in the horizontal axis. Interest in high fidelity data (e.g. video) and/or fine grain/high density data drops quickly as data ages. Interest in low fidelity data and/or course/low density data drops more slowly. Specifically, current data is typically much more relevant than older data for most tasks. Resulting data associated with low interest is considered cold data. Some data completely expires while others remain potentially permanently relevant. In either case, cold data may be stored (e.g. in an append-only format) in a network such as network 100. The data may be managed by a storage device, such as storage device 111, index server 113, and/or a NE 400. By indexing the data, for example by employing methods 700 and/or 1000, the cold data can be stored in a durable and space efficient manner, for example in data bands 500, 600, and/or 900. Further, in the event some of the cold data becomes relevant to a user, the relevant cold data can be found and retrieved from amongst the irrelevant cold data, for example by employing method 800.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a network element (NE) implemented as a storage device, comprising:

receiving, by a receiver of the NE, a plurality of data records;

receiving, by the receiver, a plurality of attributes describing aspects of the data records;

storing, by a memory of the NE, the data records in data segments in a data band of the memory;

determining, by a processor of the NE, a descriptor interval for each of the data segments, the descriptor interval comprising a minimum descriptor for each data segment and a maximum descriptor for each data segment, the minimum descriptor being a minimum value for an attribute, and the maximum descriptor being a maximum value for the attribute;

composing, by the processor, a lightweight index for the data segments, the lightweight index comprising the minimum descriptor for each data segment and the maximum descriptor for each data segment;

appending, by the processor, the lightweight index to the data segments in the data band; and transmit, by a transmitter coupled to the processor, the lightweight index to an index server to respond to a query for one of the data records.

2. The method of claim 1, further comprising determining, by the processor, a second descriptor interval for each of the data segments, wherein the second descriptor interval comprises a second minimum descriptor for each data segment and a second maximum descriptor for each data segment, wherein the second minimum descriptor is a minimum value for a second attribute, wherein the second maximum descriptor is a maximum value for the second attribute, and wherein the lightweight index further comprises the second minimum descriptor and the second maximum descriptor.

3. The method of claim 2, wherein each data segment comprises data associated with a time range, and wherein the minimum descriptor, the maximum descriptor, the second minimum descriptor, and the second maximum descriptor for an associated data segment each describe different aspects of the data over the associated time range.

4. The method of claim 1, further comprising appending, by the processor, a seal to the data band to indicate the data band is full.

5. The method of claim 4, wherein the seal comprises a pointer to a relative start location of the lightweight index in the data band.

6. The method of claim 1, wherein the data band is an append-only data band.

7. The method of claim 1, wherein the index server queries the storage device for the one of the data records based on the lightweight index.

8. The method of claim 1, wherein storing the data segments in the data band further comprises:

receiving, by the receiver, a partial data record;

appending, by the processor, the partial data record to a last completed data segment in the data band;

creating, by the processor, a newly completed data segment by compressing data contained in the partial data record; and overwriting, by the processor, the partial data record by appending the newly completed data segment to the last completed data segment.

9. The method of claim 1, further comprising:

receiving, by the receiver, a query comprising at least one query term; and obtaining, by the processor, a relative start location for each data segment for which the query term is satisfied for a range bounded by a found data segment's minimum descriptor and maximum descriptor.

10. An apparatus comprising:

a receiver configured to:
  receive a plurality of data records; and
  receive a plurality of attributes for each data record, wherein each attribute describes an aspect of data contained in an associated data record;

a memory comprising a data band configured to store the data records as data segments in an append-only format;

a processor coupled to the receiver and the memory, wherein the processor is configured to:
  determine a plurality of descriptor intervals for each of the data segments, each of the descriptor intervals comprising a minimum descriptor for each data segment and a maximum descriptor for each data segment, the minimum descriptor being a minimum value for an attribute, and the maximum descriptor being a maximum value for the attribute, and each of the descriptor intervals being associated with a different attribute;
  compose a lightweight index for the data segments, wherein the lightweight index comprises the minimum descriptor for each data segment and the maximum descriptor for each data segment; and
  append the lightweight index to the data segments in the data band; and a transmitter coupled to the processor and configured to transmit the lightweight index to an index server to respond to a query for one of the data records.

11. The apparatus of claim 10, wherein the receiver is further configured to receive a time for each data segment; and wherein the lightweight index comprises a time range for each data segment based on the received time.

12. The apparatus of claim 11, wherein the data segments comprise sensor data, and wherein the attributes describe the sensor data over the time range.

13. The apparatus of claim 11, wherein the data segments comprise media data, and wherein the attributes comprise metadata that describes the media data over the time range.

14. The apparatus of claim 11, wherein the lightweight index is appended to the data band when the data band is full of the data segments, and wherein a single lightweight index is employed for the data band.

15. The apparatus of claim 14, wherein the processor is further configured to append a seal to the data band after appending the lightweight index to indicate the data band is full.

16. The apparatus of claim 15, wherein the seal comprises a pointer to a relative start location of the lightweight index in the data band.

17. A method implemented by a network element (NE) implemented as an index server, comprising:

storing, by a memory of the NE, a plurality of lightweight indices each associated with one of a plurality of append-only data bands, wherein each lightweight index comprises:
  at least one minimum descriptor for each of a plurality of data segments in the associated data band; and
  at least one maximum descriptor for each of the plurality of data segments in the associated data band;

receiving, by a receiver of the NE, a query comprising at least one query term; and searching, by a processor of the NE, the stored lightweight indices to find the data segments for which the query term is satisfied for a range bounded by a found data segment's minimum descriptor and maximum descriptor; and transmitting, by a transmitter of the NE, an indication of each data band comprising a found data segment and a relative start location for each found data segment in the associated data band to a storage device.

18. The method of claim 17, wherein the query is received by the index server from a client.

19. The method of claim 17, wherein the method further comprises:
- receiving, by the receiver, data records; and
- storing, by the memory, each of the data records as one of the data segments in the associated data band,
- wherein the storing the plurality of lightweight indices comprises appending each lightweight index to an append-only data band after the append-only data band is full of data segments.

20. The method of claim 19, wherein a seal is appended to each full data band, and wherein searching the stored lightweight indices further comprises reviewing each seal to find pointers to relative start locations of the stored lightweight indices.

* * * * *